Nov. 3, 1931.    C. OPOLO    1,829,808
TRACTOR
Filed March 20, 1929    3 Sheets-Sheet 1

Inventor.
Charles Opolo,
by Hazard and Miller
Attorneys.

Nov. 3, 1931.  C. OPOLO  1,829,808
TRACTOR
Filed March 20, 1929  3 Sheets-Sheet 3

Inventor:
Charles Opolo.
by Hazard and Miller
Attorneys.

Patented Nov. 3, 1931

1,829,808

UNITED STATES PATENT OFFICE

CHARLES OPOLO, OF LOS ANGELES, CALIFORNIA

TRACTOR

Application filed March 20, 1929. Serial No. 348,481.

This invention relates to tractors.

An object of the invention is the provision of a tractor having four or more traction-wheels driven from a common prime mover.

Another object of the invention is the provision of a tractor, the number of traction-wheels of which may be altered, the purpose being to permit increasing the number of traction-wheels if the tractor is to be used upon sandy or muddy ground, or if the draw bar load is to be increased.

A more detailed object is the provision of a tractor comprising a main power unit mounted upon suitable driving, or traction-wheels, and to which one or more auxiliary units may be added, each of these units also being supported upon traction-wheels and having means for coupling its wheels to the engine of the main power unit, with the result that all of the wheels are driven by a single prime mover common to all.

A further object is the provision of a tractor composed of a plurality of removable units as described, and which is provided with means for steering the assembled tractor, so as to cause it to follow the desired course.

Another object is the provision of a tractor having two or more driving axles, each having suitable traction-wheels associated therewith, and connected to a common prime mover, and each axle being mounted in a housing so connected to the housings of the other axles, that torsional movement of each housing in respect to the others, is permitted, with the result that all the driving wheels will remain in engagement with the surface over which the tractor is moving, regardless of how uneven that surface may be.

A still further object is the provision of a tractor composed of a main power unit, and one of the main auxiliary traction units removably attachable thereto, the coupling means being of such a nature that each unit is held against longitudinal displacement from the remainder of the tractor, but is permitted universal movement in respect thereto, so that it may swing vertically in respect to the remainder of the tractor, as in moving over a hummock, or may swing laterally as in altering the line of movement of the tractor, or may twist as in moving onto a surface at a different lateral inclination from that upon which the remainder of the tractor is supported.

It is a still further object of my invention, to improve upon the tractors heretofore employed for developing relatively high draw-bar horse power in pulling loads over uneven and relatively soft surfaces, and to do so in such a way as to produce a tractor which is simple and rugged in structure, is inexpensive in manufacture, and which is positive and relatively speedy in operation.

The invention possesses other objects and advantageous features, some of which, with those enumerated, will be set forth in the following description of the invention's particular embodiment which is illustrated in the drawings accompanying and forming a part of the specification.

Referring to the drawings.

Figure 3:
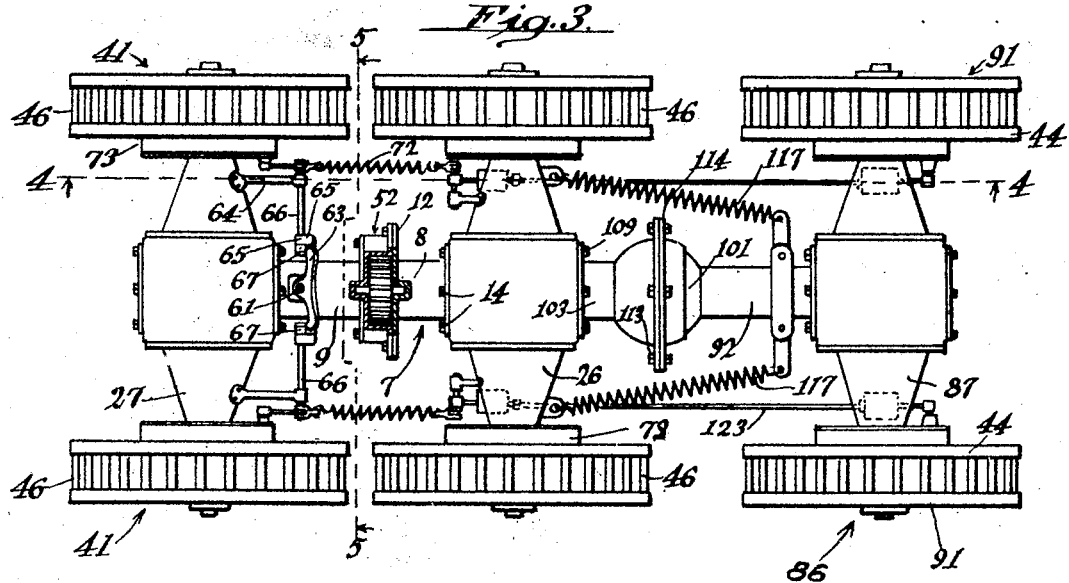
Fig. 3 is a top plan view of the running gear, the motor and associated parts having been removed to better disclose the nature of the invention.
Figure 5:
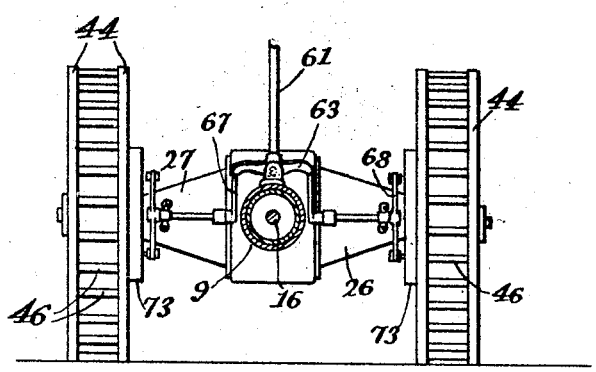

Fig. 5 is a vertical, transverse sectional view taken substantially upon the line 5—5 of Fig. 3, with the direction of view as indicated.

Following is a description of a tractor embodying the principles of my invention in the most practical form thereof, of which I am at present aware.

Main power unit

The main power unit indicated in its entirety at 6, comprises a frame 7. This frame is made up of front and rear sections 8 and 9 respectively, each of which is tubular, with the after section 9 rotatably disposed upon the forward section 8. A terminal flange 11 on the after section 9 is movably retained between the after side of a gear housing 12, and a preferably split annular flange 13 removably attachable to the gear housing 12 by bolts 14 or their equivalent, so as to hold the after section 9 of the frame 7, against longitudinal displacement from the forward section 8, but permit relative torsional or twisting movement of either in respect to the other.

A main drive shaft 16 is disposed coaxially within the frame 7, being revolubly mounted within journals 17 and 18, held rigid with the forward frame section 8, by brackets 19 and 21 respectively.

Each of the frame sections 8 and 9, has an axle housing 26 and 27 respectively, rigidly attached thereto, these axle housings extending transversely in respect to the frame 7. Driving axles 28 and 29 are journalled within the housings 26 and 27 respectively, each of which is enlarged substantially midway between its ends, for the accommodation of a suitable differential 31. Each differential comprises a differential housing 32 carrying a ring gear 33 and a plurality of differential pinions 34 journalled therein, the axes of these differential pinions 34, extending radially outwards from the axis of the associated axle 28 or 29. All of the pinions 34 of each differential, are enmeshed with two opposed axle drive gears 36 and 37, it being understood that each axle is composed of two axially aligned sections, each of which has one of the axle drive gears 36 or 37 rigid therewith. However, inasmuch as the particular form of the differential employed, has no immediate bearing upon the present invention, I wish it to be understood that I do not wish to be limited to the precise form of differential described, but that any suitable type of such mechanism may be employed.

A wheel 41 is rigidly attached to each section of each axle adjacent the outer end thereof. While any suitable type of traction-wheel may be employed, each of those herein shown and described, is composed of a plurality of spokes 42 radiating from a hub structure 43 to which the associated axle section is keyed. Each wheel 41 includes an inner and outer series of spokes 42, each series supporting an annular angle iron 44. Traction means preferably in the form of a plurality of short angle irons 46 are made fast between the two annular angle irons 44, with the result that each wheel develops a relatively high tractive force when supported upon a relatively soft surface such as sand or mud, and still will not damage a macadamized road, because of the relatively smooth surfaces of the annular angle irons 44 which contact that relatively hard surface when the tractor is supported thereupon.

Figure 2:
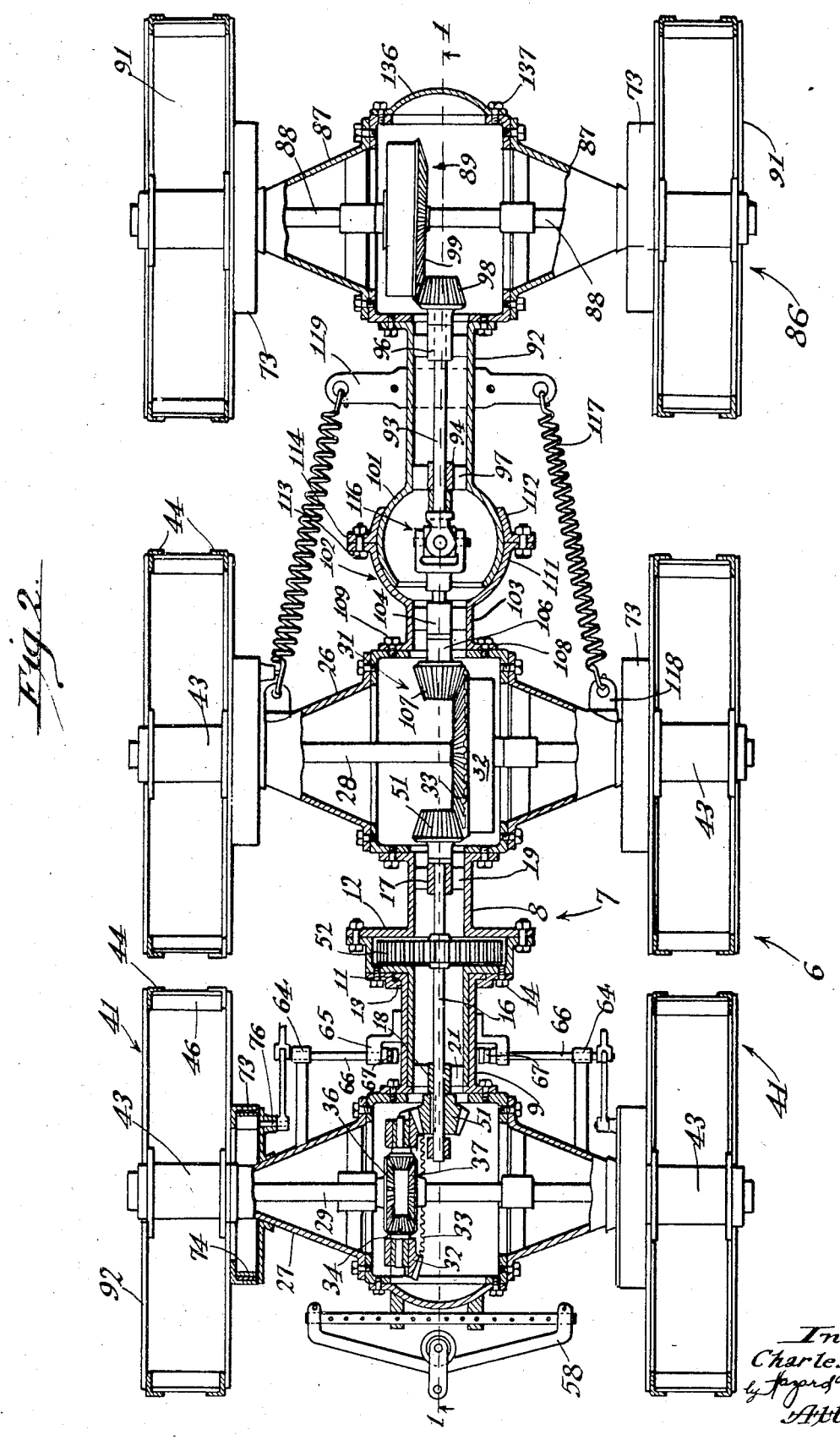
Fig. 2 is a horizontal sectional view taken upon the line 2—2 of Fig. 1, with the direction of view as indicated, and with portions shown in top plan view.

Each of the ring gears 33 is enmeshed with a pinion gear 51. The pinion gears 51 are rigid with the main drive shaft 16 adjacent each end thereof, and are enmeshed with their respective ring gears 33 from opposite sides, as clearly shown upon Fig. 2. In other words, the ring gear 33 associated with the forward axle 28, is disposed upon the right hand side of the main drive shaft 16, whereas the ring gear 33 of the after axle 29, is disposed upon the left hand side of the drive shaft 16, the purpose being to effect rotation of both axles in the same direction by applying rotational movement to the main drive shaft 16. For this purpose the shaft 16 is connected by a train of gearing indicated in its entirety at 52, to any suitable type of prime mover such as an internal combustion motor 53, it being understood that any suitable type of change-speed transmission 54 may be interposed anywhere between the motor 53 and drive shaft 16, if desired. The motor 53 and associated parts such as the fuel supply tank 56, may be conveniently supported upon the forward axle housing 26, whereas the driver's seat 57 may be supported upon the after axle housing 27. Furthermore, any suitable type of drawbar 58 may be rigid with the after axle housing 27, to permit coupling the tractor to its load.

Steering mechanism

Figure 4:
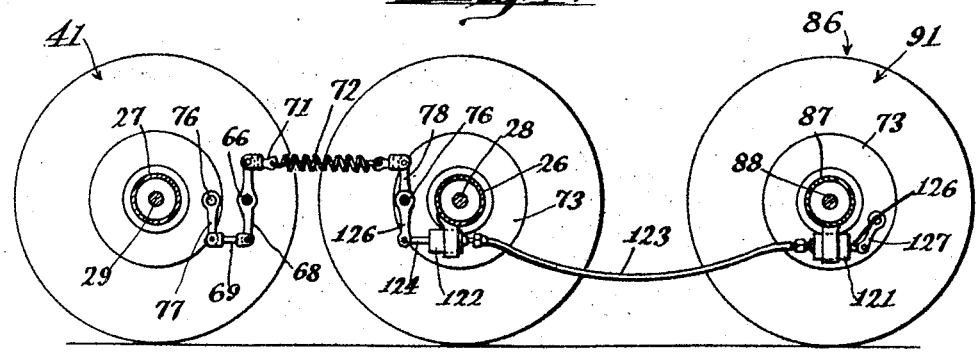
Fig. 4 is a longitudinal, vertical sectional view taken substantially upon the line 4—4 of Fig. 3, with the direction of view as indicated.

A steering-post 61 is mounted upon the after frame section 9, to position a steering-wheel 62 carried thereby, so as to be accessible from the driver's seat 57. A yoke 63 adjacent the lower end of the steering-post 61, is so associated therewith that it may be turned about the axis of the steering-post by turning the steering-wheel 62. The after axle housing 27 has rigidly attached thereto, a pair of brackets 64. Within these brackets and within brackets 65 carried by the after frame section 9, and in axial alignment with the brackets 64, are journalled shafts 66. A lever 67 is made fast adjacent the inner end of each of the shafts 66, and extends upwards therefrom to such position that it is engaged by the associated end of the yoke 63 when that end is moved aft. Each shaft 66 carries another lever 68, the shaft 66 being connected to this lever 68, midway between the ends thereof. Links 69 and 71 are pivoted to the lower and upper ends respectively, of the lever 68, the upper link 71 having a tension spring 72 interposed therein, as best shown upon Fig. 4.

Each of the wheels 41, has a brake drum 73 rigid therewith, adapted to be frictionally engaged by a suitable friction element such as a brake shoe 74. These shoes 74 are adapted to be pressed into braking engagement with their associated drums 73, by any suitable mechanism (not shown) activated by imparting rotary movement to a stub shaft 76. Each of the stub shafts 76 associated with the after wheels 41, has a lever 77 rigid therewith, to the outer end of which the associated link 69 is pivoted; whereas each of the stub shafts 76 associated with the forward wheels 41, has a lever 78 rigid therewith, pivoted to the link 71. As a result, when rotary movement is imparted to the shaft 66, both stub shafts 76 upon the same side of the tractor, will also be rotated in the same direction, to effect setting or releasing the brakes of the wheels 41 upon that side of the tractor, depending upon the direction of rotary movement of the shaft 66. However, because of the imposition of the spring 72 within the link 71, the brake associated with the after wheel 41, may be locked; while the brake associated with the forward wheel 41 on the same side, may be set less tightly.

It may thus be readily understood that when it is desired to turn the tractor, say to the left, as viewed upon Fig. 3, the steering-wheel 62 should be turned so as to turn the yoke 63 in a counter-clockwise direction as viewed upon that figure. This will cause the yoke 63 to engage the lever 67 associated with the wheels 41 upon the left hand side of the tractor. This will apply the brakes to those wheels, locking the rear left hand wheel, and applying a lesser degree of braking action to the forward left hand wheel. This will direct all the power from the motor 53 into the wheels 41 on the right side of the tractor, because of the action of the differentials 31. This will cause the right hand wheels to move ahead, pivoting the tractor around the rear left hand wheel. This will necessitate a certain degree of lateral sliding of the forward left hand wheel, which is facilitated by the slight rotation of that wheel, permitted because its brake is not locked. When the tractor has been headed in the desired course, the brakes of the left hand wheel should be released by returning the steering-wheel 62 to normal position, whereupon the tractor will proceed as directed. If it be desired to turn the tractor in the opposite direction, it is apparent that the steering-wheel 62 should be turned to the right, setting the brakes of the right hand wheels, and permitting the left hand wheels to rotate, pivoting the tractor about the right rear wheel.

Auxiliary traction units

When the conditions under which the tractor is to be employed, are such that it is desired to have an increased number of traction-wheels, one or more auxiliary units 86 may be easily added thereto. Each of these units comprises an axle housing 87 within which an axle 88 is journalled, this axle 88 also having a differential 89, and being composed of two sections, to each of which a traction-wheel 91 is keyed.

A shaft housing 92 extends aft of the axle housing 87, and has journalled therein, a drive shaft 93, bearings 94 and 96 being supported within the housing 92 by suitable brackets 97. A pinion gear 98 rigid with the forward end of the shaft 93, enmeshes the ring gear 99 of the differential 89.

Figure 1:
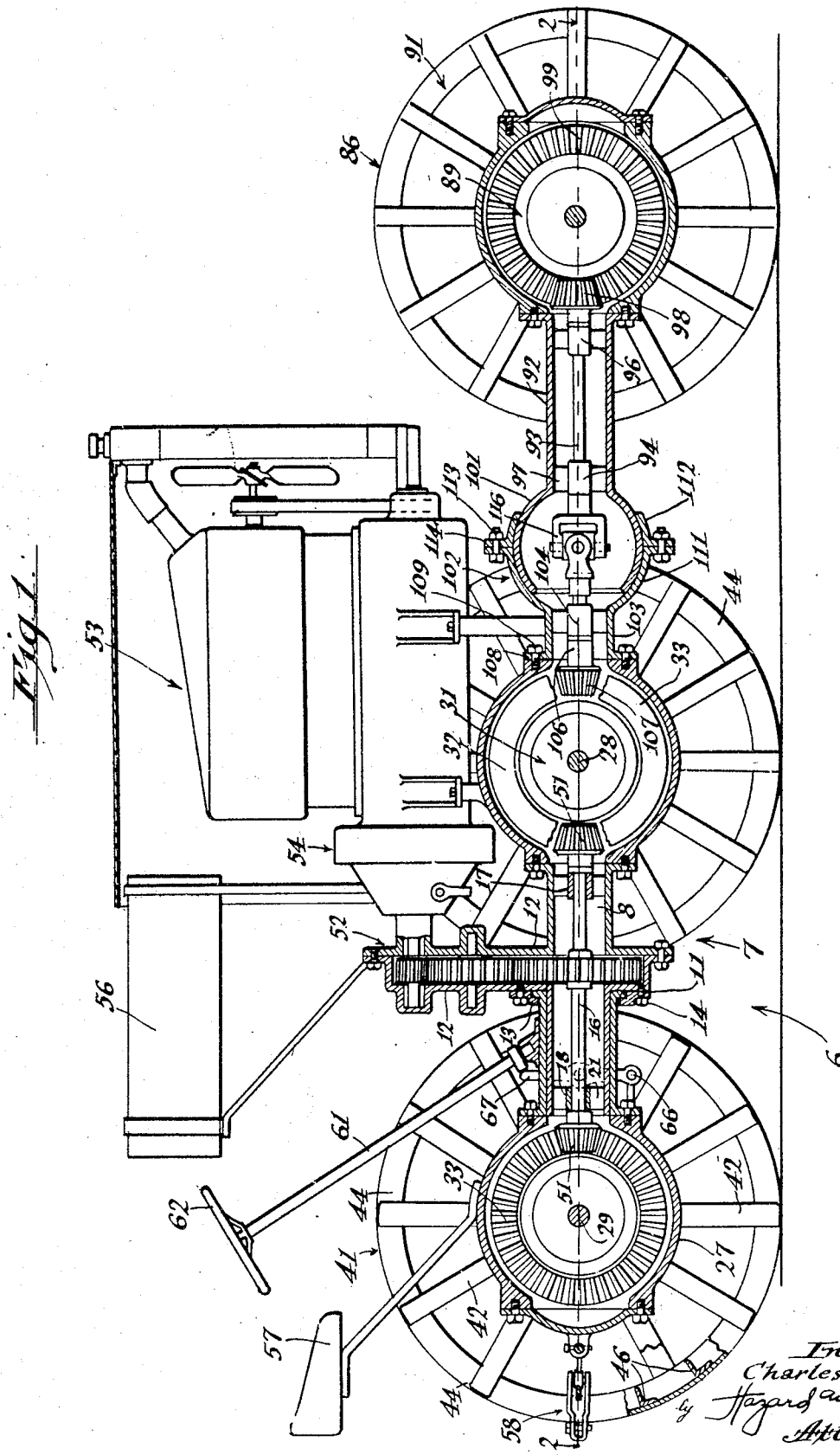
Figure 1 is a vertical, medial sectional view of a tractor embodying the principles of my invention, with portions thereof being shown in side elevation. The plane of section may be considered as having been taken upon the line 1—1 of Fig. 2, with the direction of view as indicated.

The after end of the shaft housing 92, terminates in a hollow spherical shell 101 which is embraced by a slightly larger spherical shell 102. A shaft housing extension 103 is rigid with the larger shell 102, and is provided with a bearing 104 within which a stub shaft 106 is journalled. The stub shaft 106 carries a pinion gear 107; and a flange 108 on the shaft housing extension 103, permits rigidly securing the extension 103 to the forward side of the front axle housing 26 of the main power unit 6, cap screws 109 or their equivalent, being employed for this purpose. The parts are so proportioned and arranged that when the shaft housing extension 103 is attached to the axle housing 26, the pinion 107 will be enmeshed with the ring gear 33 of the forward axle 29, as clearly shown upon Figs. 1 and 2.

The larger spherical shell 102 is composed of two sections 111 and 112, the section 111 which is preferably integral with the housing extension 103, having the configuration of a hollow hemisphere; whereas the smaller section 112 has the configuration of a hollow spherical zone. The smaller section 112 is removably attachable to the larger section 111, by means of bolts 113 passing through flanges 114 with which each of the sections 111 and 112 are provided, it being understood that the section 112 is to be attached to the section 111 after the smaller hollow sphere 101 has been seated within the larger section 111.

The stub shaft 106 is connected to the shaft 93, by means of a universal joint 116 which is so arranged that the axes of its pins intersect at the center of both of the spherical shells 101 and 102.

From the above description, it will be understood that the auxiliary unit 86 may be removably attached to the main power unit 6, in such position that power from the motor 53 will be applied to the wheels 91 of the auxiliary unit 86, as well as to the wheels 41 of the main power unit 6. Furthermore, the connection between the auxiliary unit 86 and the main power unit 6, is such that the auxiliary unit is capable of universal movement in respect to the main power unit, because of the universal joint 116 by which the shaft 93 and stub shaft 106 are joined, and because of the knuckle joint formed by the spherical shells 101 and 102. Longitudinal displacement of the auxiliary unit 86 in respect to the main power unit 6, is prevented because of the seating of the smaller spherical shell 101 within the larger shell 102; and relatively heavy springs 117 are under tension between brackets 118 carried by the axle housing 26, and brackets 119 carried by the shaft housing 92 of the auxiliary unit 86. The function of these springs is to urge the auxiliary unit 86 into alignment with the remainder of the tractor, but to permit universal movement of either of the units in respect to the other.

The auxiliary unit 86 is similarly provided with selectively operable braking mechanisms associated with each wheel 91. These braking mechanisms are similar to those previously described; but in view of the fact that variation in the effective distance between the wheel 91 upon one side of the unit 86 and the adjacent forward wheel 41 of the main power unit 6, will occur when the tractor is being turned, I have found it convenient to employ hydraulically operated brakes for the wheels 91 of the auxiliary units 86. For this purpose a hydraulic cylinder 121 is carried by the axle housing 87 adjacent each end thereof, this cylinder 121 being releasably connectible to a similar cylinder 122 carried by the axle housing 26, by means of a flexible hydraulic conduit 123. The plunger 124 of the cylinder 122, is pivoted to an extension 126 of the associated lever 78, so that when the associated brakes are applied, the plunger 124 will be thrust inwards of the cylinder 122, forcing hydraulic fluid from that cylinder through the conduit 123, into the cylinder 121. This will force the plunger 126 of the associated cylinder 121, outwards, moving a lever 127 which is pivoted thereto, so as to apply the brake of the associated wheel 91.

The front side of the axle housing 87, is provided with a removable cover plate 136 which is removably attachable thereto by means of a plurality of cap screws 137 or their equivalent. By removing this cover plate 136, it is made possible to attach another auxiliary unit 186 to the front of the housing 87; and inasmuch as the units 86 are preferably of identical construction, as many of these auxiliary units 86 may be employed as may be desired, depending upon the condition of the surface over which the tractor is to be run, and upon the magnitude of the drawbar pull it is desired to develop.

Operation

As will be understood from the above description, power from the engine 53, is applied equally to the axles 29 of the main power unit 6, and also to the axles 88 of as many auxiliary units as are coupled thereto. Each of the axle housings 87, 26, and 27, is capable of twisting, or torsional movement in respect to the others, so that as the tractor proceeds over uneven ground, all of the wheels 91 and 44 will remain in contact with the surface of the ground, with the result that such an uneven surface will have no effect upon the tractive efficiency of the device. This twisting of the axle housing 87 of the auxiliary unit 86 in respect to the remainder of the tractor, is made possible through the journalling of the smaller spherical shell 101 within the larger shell 102; and the twisting of either of the auxiliary housing 26, or 27, of the main power unit 6, is made possible by means of the seating of the flange 11 between the gear housing 12 and flange 13.

Steering of the tractor when one or more of the auxiliary units 86 are connected thereto, is effected in the manner previously described, it being understood that when the brakes upon either side of the main power unit, are applied, the brakes of all of the connected auxiliary units on that same side of the tractor, will also be applied. Preferably the parts are so arranged that the brakes of the auxiliary unit 86, will be applied slightly before they are applied to the main unit 6, causing the unit to start to swing slightly before the remainder of the tractor alters its course. This will tend to bring the auxiliary units 86, and main power unit 6, into alignment as the new course is approached. However, if this alignment is not accurately attained, the springs 117 may be relied upon to again swing the unit 86 to which they are connected, into proper alignment, so that the tractor may proceed in the selected course.

It is to be understood that the details of the invention as herein disclosed, are subject to alteration within the spirit or scope of the appended claims.

I claim:

1. In a tractor, a frame, an auxiliary frame removably securable thereto, means permitting universal movement of said frames in respect to each other when secured together, means holding said frames against longitudinal displacement, and spring means urging said frames into alignment with each other.

2. A tractor comprising a plurality of units, means for removably securing said units together for universal movement, each of said units comprising driving wheels and an axle, resilient means urging said units into alignment, and disengageable means for coupling said axles to a common prime mover.

3. A tractor comprising a plurality of units, means for removably securing said units together for universal movement, each of said units comprising driving wheels and an axle, resilient means urging said units into alignment, disengageable means for coupling said axles to a common prime mover, and means for steering said tractor.

4. A tractor comprising a plurality of units, means for removably securing said units together for universal movement, each unit comprising driving wheels, an axle, and a differential, resilient means urging said units into alignment, disengageable means for coupling said axles to a common prime mover, a braking device associated with each of said wheels, and means operable to apply the brakes optionally upon either side of the tractor.

5. A tractor comprising a plurality of units, means for removably securing said units together for universal movement, each unit comprising driving wheels, an axle, and a differential, resilient means urging said units into alignment, disengageable means for coupling said axles to a common prime mover, a braking device associated with each of said wheels, means operable to optionally apply all of said brakes upon either side of the vehicle, and means for imposing greater braking effort to one of the wheels than to the others on the same side of the tractor.

6. A tractor unit comprising an axle housing, an axle journalled therein, a differential interposed in said axle, driving wheels associated with said axle, a shaft housing extending from said axle housing and terminating in a hollow spherical shell, a drive shaft journalled in said shaft housing, a pinion gear on said shaft operatively engaged with said differential, a universal joint carried by said drive shaft with the axes of the differential pinions intersecting at the center of said spherical shell, a shaft housing extension, coupling means at the outer end of said extension, a hollow spherical shell at the inner end of said extension, one of said spherical shells embracing the other for universal movement, a stub shaft journalled in said extension and connected to said universal joint, a brake associated with each of said wheels, and independently operable means associated with each of said brakes for optionally developing resistance to turning of either of said wheels.

In testimony whereof I have signed my name to this specification.

CHARLES OPOLO.